(12) United States Patent
Trundle

(10) Patent No.: US 10,535,253 B1
(45) Date of Patent: *Jan. 14, 2020

(54) ABBERATION DETECTION TECHNOLOGY

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,884

(22) Filed: Oct. 5, 2018

Related U.S. Application Data

(63) Continuation of application No. 15/706,964, filed on Sep. 18, 2017, now Pat. No. 10,096,236, which is a continuation of application No. 15/282,842, filed on Sep. 30, 2016, now Pat. No. 9,767,680.

(60) Provisional application No. 62/235,048, filed on Sep. 30, 2015.

(51) Int. Cl.
*G08B 29/18* (2006.01)
*G08B 29/04* (2006.01)
*G06F 11/00* (2006.01)
*G08B 25/14* (2006.01)
*G08B 13/00* (2006.01)

(52) U.S. Cl.
CPC .......... *G08B 29/185* (2013.01); *G06F 11/00* (2013.01); *G08B 29/04* (2013.01); *G08B 13/00* (2013.01); *G08B 25/14* (2013.01)

(58) Field of Classification Search
CPC ...... G08B 29/185; G08B 29/04; G08B 25/14; G08B 13/00; G06F 11/00
USPC ........................................................ 340/506
See application file for complete search history.

(56) References Cited

U.S. PATENT DOCUMENTS

| | | | |
|---|---|---|---|
| 5,610,596 A | 3/1997 | Petitclerc | |
| 7,587,299 B2 * | 9/2009 | Miyasaka | ................ G01H 1/00 340/682 |
| 8,743,716 B2 | 6/2014 | Ree | |
| 8,786,425 B1 * | 7/2014 | Hutz | ...................... H04M 11/04 340/526 |
| 9,767,680 B1 | 9/2017 | Trundle | |
| 10,096,236 B1 | 10/2018 | Trundle | |
| 2005/0254548 A1 * | 11/2005 | Appel | ..................... G01K 3/005 374/57 |
| 2007/0094386 A1 | 4/2007 | Bley | |
| 2008/0288933 A1 * | 11/2008 | Budmiger | ............. G01F 1/8431 717/168 |
| 2010/0214103 A1 | 8/2010 | Egan | |

(Continued)

*Primary Examiner* — Hirdepal Singh
(74) *Attorney, Agent, or Firm* — Fish & Richardson P.C.

(57) ABSTRACT

In some implementations, techniques are described for detecting abnormal installations in a property monitored by a monitoring (e.g., security) system. For instance, an aberration engine may be used to detect an abnormal sensor or system installation within a property based on comparing detected installation data against local installation patterns of local providers within a certain proximity to the property. In some examples, the attributes (e.g., installation time, components used, number of tests performed, etc.) of a monitoring system installation, including installation of components of the monitoring system, may be compared to average installation times of other nearby installations to detect abnormalities in the installation.

20 Claims, 8 Drawing Sheets

(56) References Cited

U.S. PATENT DOCUMENTS

| | | |
|---|---|---|
| 2011/0006891 A1 | 1/2011 | Cho |
| 2015/0160935 A1 | 6/2015 | Nye |
| 2015/0229918 A1 | 8/2015 | Kosuge |
| 2015/0301515 A1 | 10/2015 | Houmb |
| 2015/0316594 A1 | 11/2015 | Kania |
| 2016/0225240 A1 | 8/2016 | Voddhi |
| 2016/0358457 A1 | 12/2016 | Nye |
| 2018/0293864 A1* | 10/2018 | Wedig .................. G08B 29/186 |
| 2019/0066485 A1* | 2/2019 | Roberts .................. B64C 39/02 |

* cited by examiner

ABBERATION DETECTION TECHNOLOGY

CROSS-REFERENCE TO RELATED APPLICATIONS

This application is a continuation (and claims the benefit of priority under 35 USC 120) of U.S. application Ser. No. 15/706,964, filed Sep. 18, 2017, now allowed, which is a continuation of U.S. application Ser. No. 15/282,842, filed Sep. 30, 2016, now U.S. Pat. No. 9,767,680, issued Sep. 19, 2017, which claims the benefit of U.S. Provisional Application No. 62/235,048, filed Sep. 30, 2015. All of these prior applications are incorporated by reference in their entirety.

TECHNICAL FIELD

This disclosure relates to monitoring technology and detection of aberrations.

BACKGROUND

Many people equip homes and businesses with alarm systems to provide increased security for their homes and businesses. aaIn response to an alarm system detecting a security breach, the alarm system may generate an audible alert and, if the alarm system is monitored by a monitoring service, the alarm system may send electronic data to the monitoring service to alert the monitoring service of the security breach.

SUMMARY

In some implementations, techniques are described for detecting abnormal activity in a property monitored by a monitoring (e.g., security) system. For instance, an aberration engine may be used to detect an abnormal sensor or system installation within a property based on comparing detected installation data against local installation patterns of local providers within a certain proximity to the property. In some examples, the attributes (e.g., installation time, components used, number of tests performed, etc.) of a monitoring system installation, including installation of components of the monitoring system, may be compared to average installation times of other nearby installations to detect abnormalities in the installation.

Implementations of the described techniques may include hardware, methods or processes implemented at least partially in hardware, or computer-readable storage media encoded with executable instructions that, when executed by a processor, perform operations.

The details of one or more implementations are set forth in the accompanying drawings and the description below. Other features will be apparent from the description and drawings.

DESCRIPTION OF DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Techniques are described for detecting abnormal activity in a property monitored by a monitoring (e.g., security) system. For instance, an aberration engine may be used to detect an abnormal sensor or system installation within a property based on comparing detected installation data against local installation patterns of local providers within a certain proximity to the property. In some examples, the attributes (e.g., installation time, components used, number of tests performed, etc.) of a monitoring system installation, including installation of components of the monitoring system, may be compared to average installation times of other nearby installations to detect abnormalities in the installation.

Also, in some implementations, user input may be utilized to adjust monitoring system actions based on determining a set of user preferences associated with the use of aberration detection. For instance, user input related to the use of patterns in performing monitoring system actions may be received, user preferences associated with the use of the patterns in performing monitoring system actions may be determined, and automated control actions responsive to the patterns may be adjusted based on the determined user preferences.

Figure 1:
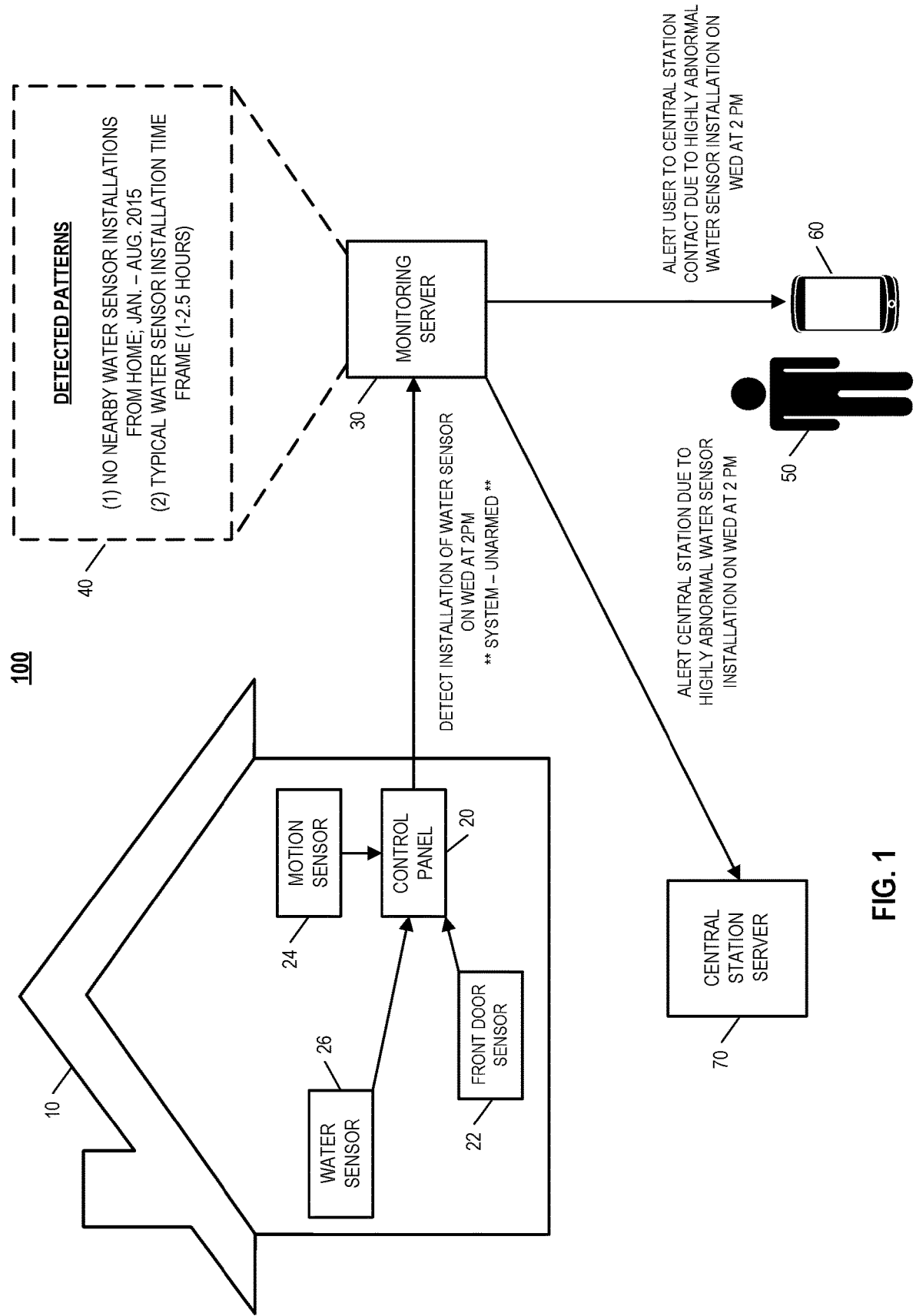
FIG. 1 illustrates an example of a process for using patterns of recurring events to control monitoring system operations.

FIG. 1 illustrates an example system 100 for using patterns of recurring events to control monitoring system operations. As shown in FIG. 1, a property 10 (e.g., a home) of a user 50 is monitored by an in-home monitoring system that includes components that are fixed within or near the property 10. The in-home monitoring system includes a control panel 20, a front door sensor 22, a motion sensor 24, and a water sensor 26. The front door sensor 22 is a contact sensor positioned at a front door of the property 10 and configured to sense whether the front door is in an open position or a closed position. The motion sensor 24 is configured to sense a moving object within the property 10. The water sensor 26 is a water detection sensor positioned near the property 10 and configured to detect the presence of water that enables provision of an alert in time to allow the prevention of water damage to the property 10.

The control panel 20 communicates over a short-range wired or wireless connection with each of the front door sensor 22, the motion sensor 24, and the water sensor 26 to receive sensor data descriptive of events detected by the front door sensor 22, the motion sensor 24, and the water sensor 26. The control panel 20 also communicates over a long-range wired or wireless connection with a monitoring server 30. The monitoring server 30 is located remote from the property 10 and manages the in-home monitoring system at the property 10, as well as other (and, perhaps, many more) in-home monitoring systems located at different properties that are owned by different users. The monitoring server 30 receives, from the control panel 20, sensor data descriptive of events detected by the sensors included in the in-home monitoring system of the property 10.

In the example shown in FIG. 1, the monitoring server 30 collects and aggregates sensor data received from the control panel 20 over a period of time. The period of time may be relatively long and may include sensor data collected over the course of several days, several weeks, several months, and even several years. The aggregated sensor data may include all events sensed by the in-home monitoring system during the period of time, regardless of whether the in-home monitoring system was armed in a manner in which the in-home monitoring system detects alarm conditions when the events occurred. The aggregated sensor data may include events sensed by other monitoring systems monitored by the monitoring server 30 and may include attributes of installation of monitoring systems.

The monitoring server 30 analyzes the aggregated sensor data with other data available to the monitoring server 30, such as location data or other user profile information for the user 50, and, based on the analysis, detects patterns of recurring events within the aggregated sensor data and the other data available to the monitoring server 30. The recurring events may be positive events tied to activity in the property detected by the in-home monitoring system or may be negative events that reflect a lack of activity (or a lack of a particular type of activity) in the property detected by the in-home monitoring system.

After detecting patterns of recurring events within the aggregated sensor data and the other data available to the monitoring server 30, the monitoring server 30 stores the detected patterns 40 into electronic storage accessible to the monitoring server 30. As shown in the detected patterns 40, the monitoring server 30 has detected patterns that suggest that there are no nearby water sensor installations from the property 10 within a six-month time frame from January to August 2015. The monitoring server 30 also has detected a pattern that the typical water sensor installation time frame ranges from 1 to 2.5 hours.

The monitoring server 30 uses the detected patterns 40 to perform operations related to the in-home monitoring system without requiring input from the user 50 to define rules for the detected patterns. For instance, in the example shown in FIG. 1, the control panel 20 detects a water sensor installation in the property 10. In this example, the control panel 20 does not detect an alarm condition based on detecting the water sensor installation because the in-home monitoring system is in an unarmed state (e.g., the user 50 may have scheduled a water sensor installation). The control panel 20 sends a message to the monitoring server 30 indicating detection of the water sensor installation at a particular time when the in-home monitoring system is in an unarmed state. The monitoring server 30 receives the message from the control panel 20 and compares the water sensor installation with the detected patterns 40 that were automatically identified by the monitoring server 30 based on past sensor and other activity collected by the monitoring server 30. Based on the comparison, the monitoring server 30 determines that the water sensor installation conflicts with the detected patterns 40 because the past sensor and other activity indicates that there are no nearby water sensor installations.

To confirm whether the first detected pattern is violated, the monitoring server 30 also determines whether local water providers have scheduled water sensor installations in nearby properties proximate to the property 10. For instance, the monitoring server 30 may determine a list of common providers that perform water sensor installations and scheduled installations within the neighborhood where the property 10 is located. The list of common providers is then sent to the monitoring server 30 over a long-range wireless network (e.g., Cellular network). Based on the determined list of common providers, the monitoring server 30 determines that the water sensor installation within the property 10 is not included in the list of common providers, and, therefore, the first detected pattern has been violated. Accordingly, the monitoring server 30 determines that the water sensor installation on Wednesday at 2 PM that is detected by the control panel 20 is abnormal and sends an alert to the user 50 indicating the abnormal water sensor installation. At this time, the monitoring server 30 withholds alerting a central monitoring station server 70 used by a central monitoring station that handles dispatching of emergency services based on alarm conditions detected by monitoring systems. The monitoring server 30 may withhold alerting the central monitoring station server 70 because, although the water sensor installation is abnormal, the water sensor installation event does not have a high enough degree of abnormality to warrant contacting the central monitoring station server 70 without first alerting the user 50.

The user 50 may view the alert on the mobile phone 60 and take action with respect to the abnormal water sensor installation. For example, the user 50 may provide user input indicating that the abnormal water sensor installation is an actual alarm condition or that the abnormal water sensor installation is not an alarm condition and should be ignored by the monitoring system. In this example, the mobile phone 60 receives the user input provided by the user 50 and communicates the received user input to the monitoring server 30. The monitoring server 30 receives the user input from the mobile phone 60 and, in this case, ignores the abnormal water sensor installation because the user 50 confirmed that the abnormal water sensor installation was a scheduled addition to the monitoring system.

Figure 2:
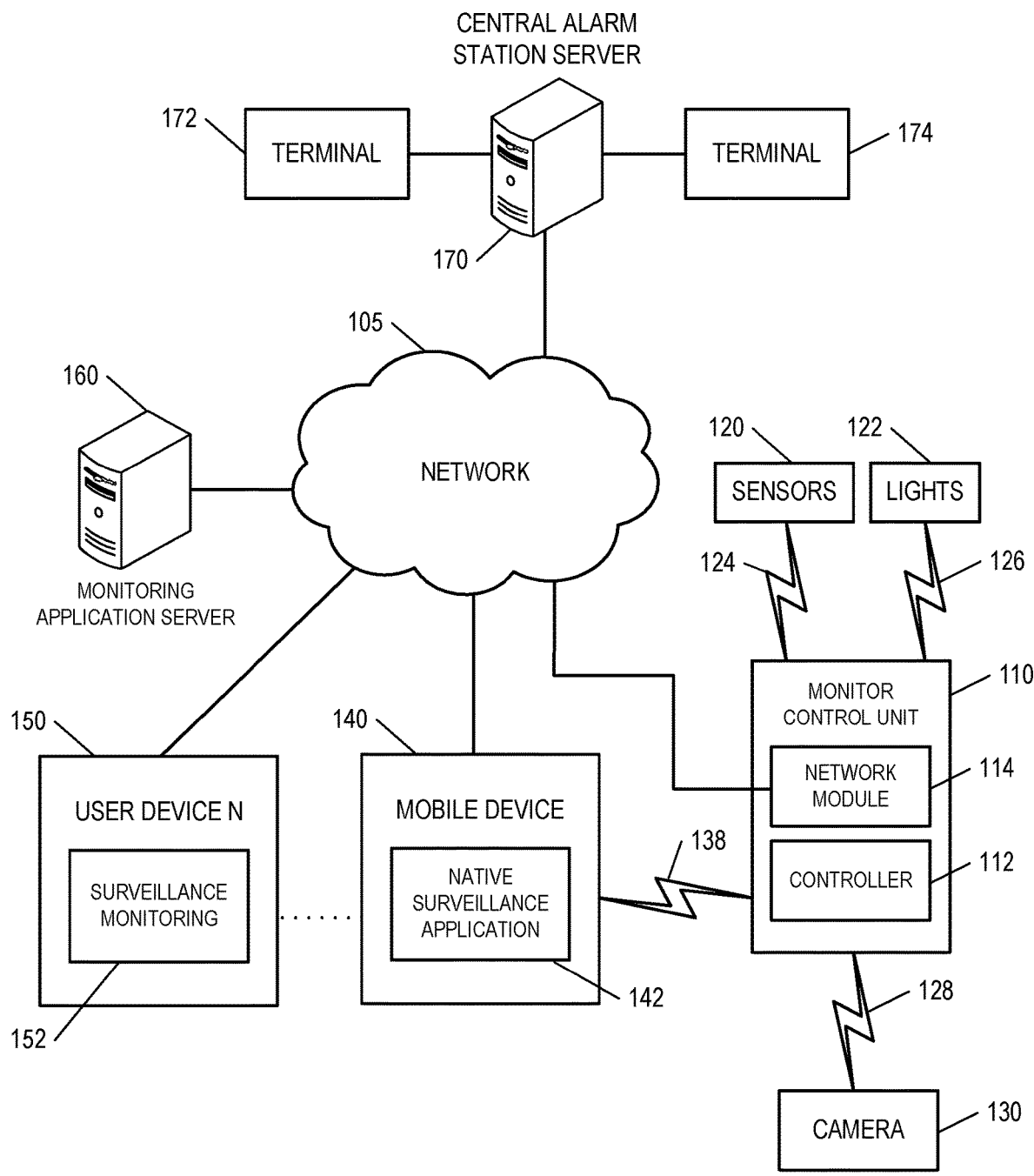
FIG. 2 illustrates an example of a system.

FIG. 2 illustrates an example of an electronic system 200 configured to provide surveillance and reporting. The electronic system 200 includes a network 105, a monitoring system control unit 110, one or more user devices 140, 150, a monitoring server 160, and a central alarm station server 170. In some examples, the network 105 facilitates communications between the monitoring system control unit 110, the one or more user devices 140, 150, the monitoring server 160, and the central alarm station server 170.

The network 105 is configured to enable exchange of electronic communications between devices connected to the network 105. For example, the network 105 may be configured to enable exchange of electronic communications between the monitoring system control unit 110, the one or more user devices 140, 150, the monitoring server 160, and the central alarm station server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voice band modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more lighting systems and is configured to control operation of the one or more lighting systems. The module 122 may control the one or more lighting systems based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra-Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra-Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "arming state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitor control unit 110. The camera 130 may employ a small solar cell to recharge the battery when light is available. Alternatively, the camera 130 may be powered by the controller's 112 power supply if the camera 130 is co-located with the controller 112.

The sensors 120, the module 122, and the camera 130 communicate with the controller 112 over communication links 124, 126, and 128. The communication links 124, 126, and 128 may be a wired or wireless data pathway configured to transmit signals from the sensors 120, the module 122, and the camera 130 to the controller 112. The sensors 120, the module 122, and the camera 130 may continuously transmit sensed values to the controller 112, periodically transmit sensed values to the controller 112, or transmit sensed values to the controller 112 in response to a change in a sensed value.

The communication link 128 over which the camera 130 and the controller 112 communicate may include a local network. The camera 130 and the controller 112 may exchange images and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring server 160 is an electronic device configured to provide monitoring services by exchanging electronic communications with the monitoring system control unit 110, the one or more user devices 140, 150, and the central alarm station server 170 over the network 105. For example, the monitoring server 160 may be configured to monitor events (e.g., alarm events) generated by the monitoring system control unit 110. In this example, the monitoring server 160 may exchange electronic communications with the network module 114 included in the monitoring system control unit 110 to receive information regarding events (e.g., alarm events) detected by the monitoring system control unit 110. The monitoring server 160 also may receive information regarding events (e.g., alarm events) from the one or more user devices 140, 150.

In some examples, the monitoring server 160 may route alarm data received from the network module 114 or the one or more user devices 140, 150 to the central alarm station server 170. For example, the monitoring server 160 may transmit the alarm data to the central alarm station server 170 over the network 105.

The monitoring server 160 may store sensor and image data received from the monitoring system and perform analysis of sensor and image data received from the monitoring system. Based on the analysis, the monitoring server 160 may communicate with and control aspects of the monitoring system control unit 110 or the one or more user devices 140, 150.

The central alarm station server 170 is an electronic device configured to provide alarm monitoring service by exchanging communications with the monitoring system control unit 110, the one or more mobile devices 140, 150, and the monitoring server 160 over the network 105. For example, the central alarm station server 170 may be configured to monitor alarm events generated by the monitoring system control unit 110. In this example, the central alarm station server 170 may exchange communications with the network module 114 included in the monitoring system control unit 110 to receive information regarding alarm events detected by the monitoring system control unit 110. The central alarm station server 170 also may receive information regarding alarm events from the one or more mobile devices 140, 150.

The central alarm station server 170 is connected to multiple terminals 172 and 174. The terminals 172 and 174 may be used by operators to process alarm events. For example, the central alarm station server 170 may route alarm data to the terminals 172 and 174 to enable an operator to process the alarm data. The terminals 172 and 174 may include general-purpose computers (e.g., desktop personal computers, workstations, or laptop computers) that are configured to receive alarm data from a server in the central alarm station server 170 and render a display of information based on the alarm data. For instance, the controller 112 may control the network module 114 to transmit, to the central alarm station server 170, alarm data indicating that a sensor 120 detected a door opening when the monitoring system was armed. The central alarm station server 170 may receive the alarm data and route the alarm data to the terminal 172 for processing by an operator associated with the terminal 172. The terminal 172 may render a display to the operator that includes information associated with the alarm event (e.g., the name of the user of the alarm system, the address of the building the alarm system is monitoring, the type of alarm event, etc.) and the operator may handle the alarm event based on the displayed information.

In some implementations, the terminals 172 and 174 may be mobile devices or devices designed for a specific function. Although FIG. 2 illustrates two terminals for brevity, actual implementations may include more (and, perhaps, many more) terminals.

The one or more user devices 140, 150 are devices that host and display user interfaces. For instance, the user device 140 is a mobile device that hosts one or more native applications (e.g., the native surveillance application 142). The user device 140 may be a cellular phone or a non-cellular locally networked device with a display. The user device 140 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 140 may perform functions unrelated to the monitoring system, such as placing personal telephone calls, playing music, playing video, displaying pictures, browsing the Internet, maintaining an electronic calendar, etc.

The user device 140 includes a native surveillance application 142. The native surveillance application 142 refers to a software/firmware program running on the corresponding mobile device that enables the user interface and features described throughout. The user device 140 may load or install the native surveillance application 142 based on data received over a network or data received from local media. The native surveillance application 142 runs on mobile devices platforms, such as iPhone, iPod touch, Blackberry, Google Android, Windows Mobile, etc. The native surveillance application 142 enables the user device 140 to receive and process image and sensor data from the monitoring system.

The user device 150 may be a general-purpose computer (e.g., a desktop personal computer, a workstation, or a laptop computer) that is configured to communicate with the monitoring server 160 and/or the monitoring system control unit 110 over the network 105. The user device 150 may be configured to display a surveillance monitoring user interface 152 that is generated by the user device 150 or generated by the monitoring server 160. For example, the user device 150 may be configured to display a user interface (e.g., a web page) provided by the monitoring server 160 that enables a user to perceive images captured by the camera 130 and/or reports related to the monitoring system. Although FIG. 2 illustrates two user devices for brevity, actual implementations may include more (and, perhaps, many more) or fewer user devices.

In some implementations, the one or more user devices 140, 150 communicate with and receive monitoring system data from the monitoring system control unit 110 using the communication link 138. For instance, the one or more user devices 140, 150 may communicate with the monitoring system control unit 110 using various local wireless protocols such as Wi-Fi, Bluetooth, zwave, zigbee, HomePlug (ethernet over powerline), or wired protocols such as Ethernet and USB, to connect the one or more user devices 140, 150 to local security and automation equipment. The one or more user devices 140, 150 may connect locally to the monitoring system and its sensors and other devices. The local connection may improve the speed of status and control communications because communicating through the network 105 with a remote server (e.g., the monitoring server 160) may be significantly slower.

Although the one or more user devices 140, 150 are shown as communicating with the monitoring system control unit 110, the one or more user devices 140, 150 may communicate directly with the sensors and other devices controlled by the monitoring system control unit 110. In some implementations, the one or more user devices 140, 150 replace the monitoring system control unit 110 and perform the functions of the monitoring system control unit 110 for local monitoring and long range/offsite communication.

In other implementations, the one or more user devices 140, 150 receive monitoring system data captured by the monitoring system control unit 110 through the network 105. The one or more user devices 140, 150 may receive the data from the monitoring system control unit 110 through the network 105 or the monitoring server 160 may relay data received from the monitoring system control unit 110 to the one or more user devices 140, 150 through the network 105. In this regard, the monitoring server 160 may facilitate communication between the one or more user devices 140, 150 and the monitoring system.

In some implementations, the one or more user devices 140, 150 may be configured to switch whether the one or more user devices 140, 150 communicate with the monitoring system control unit 110 directly (e.g., through link 138) or through the monitoring server 160 (e.g., through network 105) based on a location of the one or more user devices 140, 150. For instance, when the one or more user devices 140, 150 are located close to the monitoring system control unit 110 and in range to communicate directly with the monitoring system control unit 110, the one or more user devices 140, 150 use direct communication. When the one or more user devices 140, 150 are located far from the monitoring system control unit 110 and not in range to communicate directly with the monitoring system control unit 110, the one or more user devices 140, 150 use communication through the monitoring server 160.

Although the one or more user devices 140, 150 are shown as being connected to the network 105, in some implementations, the one or more user devices 140, 150 are not connected to the network 105. In these implementations, the one or more user devices 140, 150 communicate directly with one or more of the monitoring system components and no network (e.g., Internet) connection or reliance on remote servers is needed.

In some implementations, the one or more user devices 140, 150 are used in conjunction with only local sensors and/or local devices in a house. In these implementations, the system 200 only includes the one or more user devices 140, 150, the sensors 120, the module 122, and the camera 130. The one or more user devices 140, 150 receive data directly from the sensors 120, the module 122, and the camera 130 and sends data directly to the sensors 120, the module 122, and the camera 130. The one or more user devices 140, 150 provide the appropriate interfaces/processing to provide visual surveillance and reporting.

In other implementations, the sensors 120, the module 122, and the camera 130 are configured to communicate sensor and image data to the one or more user devices 140, 150 over network 105 (e.g., the Internet, cellular network, etc.). In yet another implementation, the sensors 120, the module 122, and the camera 130 (or a component, such as a bridge/router) are intelligent enough to change the communication pathway from a direct local pathway when the one or more user devices 140, 150 are in close physical proximity to the sensors 120, the module 122, and the camera 130 to a pathway over network 105 when the one or more user devices 140, 150 are farther from the sensors 120, the module 122, and the camera 130. In some examples, the system leverages GPS information from the one or more user devices 140, 150 to determine whether the one or more user devices 140, 150 are close enough to the sensors 120, the module 122, and the camera 130 to use the direct local pathway or whether the one or more user devices 140, 150 are far enough from the sensors 120, the module 122, and the camera 130 that the pathway over network 105 is required. In other examples, the system leverages status communications (e.g., pinging) between the one or more user devices 140, 150 and the sensors 120, the module 122, and the camera 130 to determine whether communication using the direct local pathway is possible. If communication using the direct local pathway is possible, the one or more user devices 140, 150 communicate with the sensors 120, the module 122, and the camera 130 using the direct local pathway. If communication using the direct local pathway is not possible, the one or more user devices 140, 150 communicate with the sensors 120, the module 122, and the camera 130 using the pathway over network 105.

In some implementations, the system 200 provides end users with access to images captured by the camera 130 to aid in decision making. The system 200 may transmit the images captured by the camera 130 over a wireless WAN network to the user devices 140, 150. Because transmission over a wireless WAN network may be relatively expensive, the system 200 uses several techniques to reduce costs while providing access to significant levels of useful visual information.

In some implementations, a state of the monitoring system and other events sensed by the monitoring system may be used to enable/disable video/image recording devices (e.g., the camera 130). In these implementations, the camera 130 may be set to capture images on a periodic basis when the alarm system is armed in an "Away" state, but set not to capture images when the alarm system is armed in a "Stay" state or disarmed. In addition, the camera 130 may be triggered to begin capturing images when the alarm system detects an event, such as an alarm event, a door opening event for a door that leads to an area within a field of view of the camera 130, or motion in the area within the field of view of the camera 130. In other implementations, the camera 130 may capture images continuously, but the captured images may be stored or transmitted over a network when needed.

In some implementations, one or more of the components of the system 200 (e.g., the monitoring server 160) may be configured to operate as an aberration engine. The aberration engine may automatically detect unusual/suspicious behavior associated with a building monitored by the system 200 and alert one or more users of the system 200 when unusual/suspicious behavior is detected. Because many people, at times, do not arm their security systems, the aberration engine attempts to detect unusual/suspicious behavior even when the security system is not in an armed state. In this regard, the aberration engine allows a security system to remain useful while it is disarmed.

The aberration engine may consider any inputs and data related to the system 200 to detect unusual/suspicious behavior. For instance, the inputs to the aberration engine may include:
1) Historical sensor data
2) Current status of the security system
3) Other current status information
   a. Car or smartphone locations may be considered
4) The customer's historical responses to aberration engine alerts
5) A customer-specified level of sensitivity/risk for each sensor, and some measure of how much false alarms bother them The aberration engine may provide any type of output or report based on detection of unusual/suspicious behavior. For example, the output of the aberration engine may be an alert that includes:
The event(s) that triggered the alert
Some measure of how unusual this behavior is based on history of the system 200
Some actions the customer can take
Notify the Central Station
View video
Ignore it
Ignore it, and tell us not to alert about things like this again
Activation of an alarm (e.g., siren) at a monitored property and initiation of a dialer delay period
A user may deactivate the alarm by providing appropriate input prior to expiration of the dialer delay period
If the dialer delay period expires prior to receipt of input that deactivates the alarm, the central station is notified In operation, the aberration engine uses statistical analysis to decide what is "normal" and what is "abnormal." The aberration engine may use three main things to determine what is "normal" and what is "abnormal":
1) Timing
   a. If a sensor is opening at a time of day/day of week during which it has never had any activity before, that is abnormal.
2) Order of events
   a. If there has been no activity for a long time, then the back door opens, then the motion sensor goes off, that is abnormal.
3) Other info
   a. If the front door opens while none of the occupant's phones/cars are near home, that is abnormal.

The aberration engine also may treat the lack of events as abnormal. For instance, the aberration engine may consider typical alarm system input and typical sensed events and assess whether a lack alarm system input or sensed events gives rise to concern. In some examples, the aberration engine may consider the following factors:
If the system is typically disarmed between 3:30 and 4:30 PM, but today it was not, then alert.
If Timmy's phone typically comes from school along a certain path to home between 3 and 4 PM and today it went somewhere else, alert.
If the kitchen door is normally opened shortly after the garage door on weekday evenings, but today only the garage door was opened, alert.

The aberration engine may assign an "abnormality score" to each event (not just true/false) and determine whether unusual/suspicious behavior has occurred based on the abnormality scores. For example, a bunch of slightly suspicious events (e.g., events with low to medium abnormality scores) in a short period of time may aggregate to cause the aberration engine to alert the user. In another example, a single event with a large abnormality score may cause the aberration engine to alert the user.

The aberration engine also may determine to send the alert to more people in a more visible way as the likelihood of a real event increases and as the sensitivity/risk associated with the activity increases. For example, if the front door opens in the middle of the day on a weekday, and that happens about once per month, the aberration engine may email the main end user. If the back door opens in the middle of the night while nobody is home and is left open for a threshold period of time, and the jewelry box is opened, the aberration engine may try to notify all users, possibly including the central station.

The aberration engine also may be used in reverse to try to reduce the reporting of false alarms by extending the dialer delay in cases where the alarm goes off based on events that the aberration engine considers to be normal behavior. For example, historical data may suggest that the system is typically (e.g., always) disarmed between six and seven pm on weekdays. In this example, if the front door opens at six-thirty pm as is normal, but the system is not disarmed, the aberration engine would assess the behavior as normal and determine that the potential alarm has a high probability of being a false alarm. Accordingly, in an effort to reduce false alarms reported to the central station, the aberration engine would extend the dialer delay to allow more time for the user to disarm the security system.

The aberration engine may be run on the panel/firmware, on the backend, or on any other suitable component of the security system. In some examples, functionality of the aberration engine may be distributed among various components of the security system such that some functionality may be implemented by the panel/firmware and other functionality may be implemented by the backend.

In some implementations, all of the processing described throughout this disclosure may be implemented in a monitoring system control panel located inside the property being monitored, as opposed to sending data to an external server for processing. For example, rather than being a separate server located in a remote location, the monitoring server 160 may be a logical component inside of the monitoring system control unit 110. In this example, the monitoring system control unit 110 performs the processing of the aberration engine without having to send sensor data to a separate server separated by a network.

In other implementations, all of the processing described throughout this disclosure may be performed on a remote server (e.g., monitoring server 160). In these implementations, the monitoring system control panel (or sensors themselves) may send sensor data to the remote server over a network and the remote server may perform all of the aberration engine analysis of the sensor data. For instance, the monitoring system control unit 110 sends all captured sensor data to the monitoring server 160 and the monitoring server 160 performs the processing of the aberration engine.

In still further implementations, the processing described throughout this disclosure may be mixed between a monitoring system control panel and a remote server. In these implementations, the monitoring system control panel and the remote server may share operations needed to analyze the sensor data. For instance, the monitoring system control panel may perform the aberration engine analysis of the sensor data collected relatively recently (e.g., sensor data collected within the past three months) and the remote server may perform the aberration engine analysis of the sensor data collected over a longer period of time (e.g., sensor data collected over the past several years). Alternatively, the monitoring system control panel may perform pre-processing of the sensor data, including collection and aggregation of the sensor data, and the remote server may perform the detailed analysis of detecting patterns within the sensor data. In the example shown in FIG. 2, the processing described throughout this disclosure may be mixed between the monitoring system control unit 110 and the monitoring server 160.

In some instances, the aberration engine may be implemented for a monitoring system (e.g., an alarm system) to monitor installations of the monitoring system and/or components (e.g., sensors) of the monitoring system within a property. In such instances, the aberration engine may be used to monitor various types of information such as, for example, the types of installations performed within the property, the actions of technicians performing the installations, or sensor output or location over particular periods of time that are used during the installations. During these instances, the monitoring server 160 may compare these various types of information to expected levels to detect an aberration event related to the installations performed within the property. For example, the monitor control unit 110 may receive sensor configuration information (e.g., hardware identifiers associated with the particular sensor, network configuration settings, and expected data transmission rates, etc.) from a manufacturer, and compare the measured information from a subsequent installation within the property to the received sensor configuration information from the manufacturer. In this example, the monitoring server 160 may determine an aberration event in response to detecting that the information does not match the sensor configuration information provided by the manufacturer, and transmit an alarm signal to the central alarm station server or monitoring server.

In some implementations, the system 200 may be used to evaluate the performance of multiple third-party entities that provide installation services within a particular location where a property may be located. For instance, the monitoring server 160 may gather installation information from one or more properties within the particular location and aggregate the installation information from different third-party entities that provide similar services (e.g., water sensor installations). In this regard, the monitoring server 160 may compare the service performance between the different third-party entities to determine which particular third-party entity may be underperforming relative to the other third-party entities that provide similar services within the neighborhood. For example, the monitoring server 160 may measure the time to complete a sensor installation within a property and compare the measured times between different third-party entities. The monitoring server 160 may then determine that the particular third-party entity that takes the longest time to complete the sensor installation may be underperforming relative to the other third-party entities.

Figure 3A:
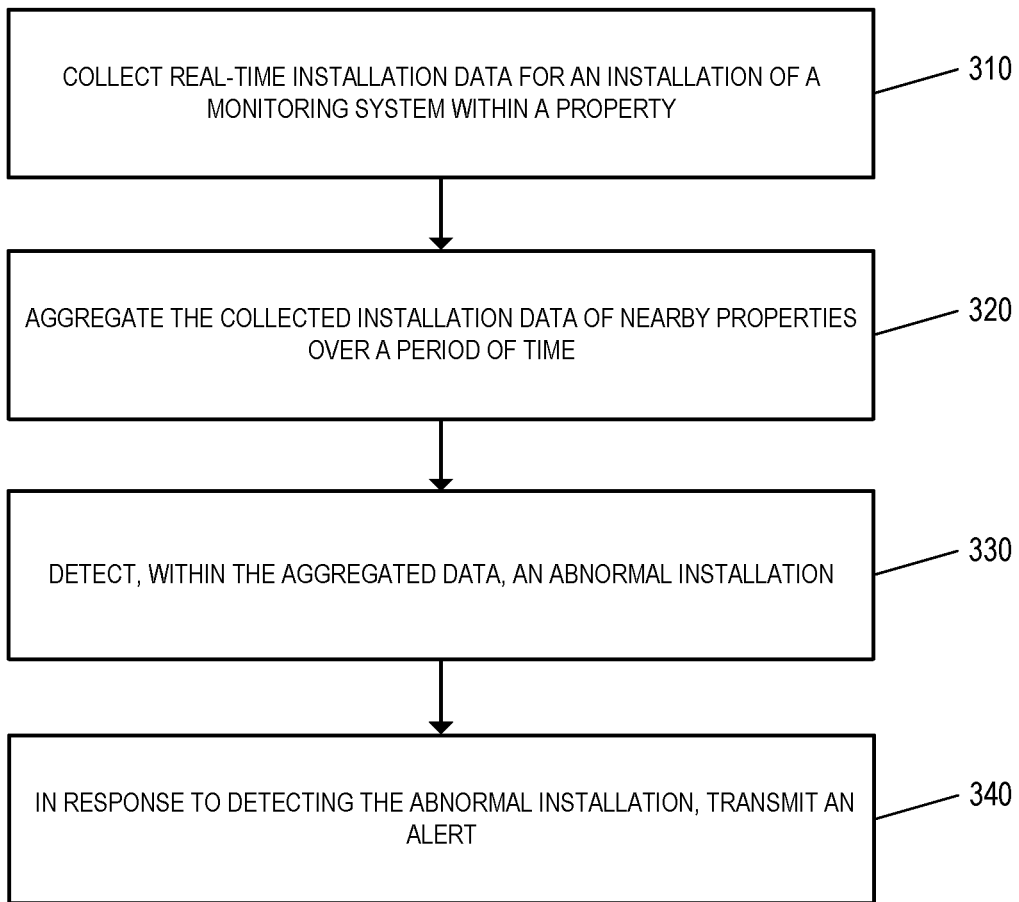
FIGS. 3A-3B illustrate examples of processes.
Figure 3B:
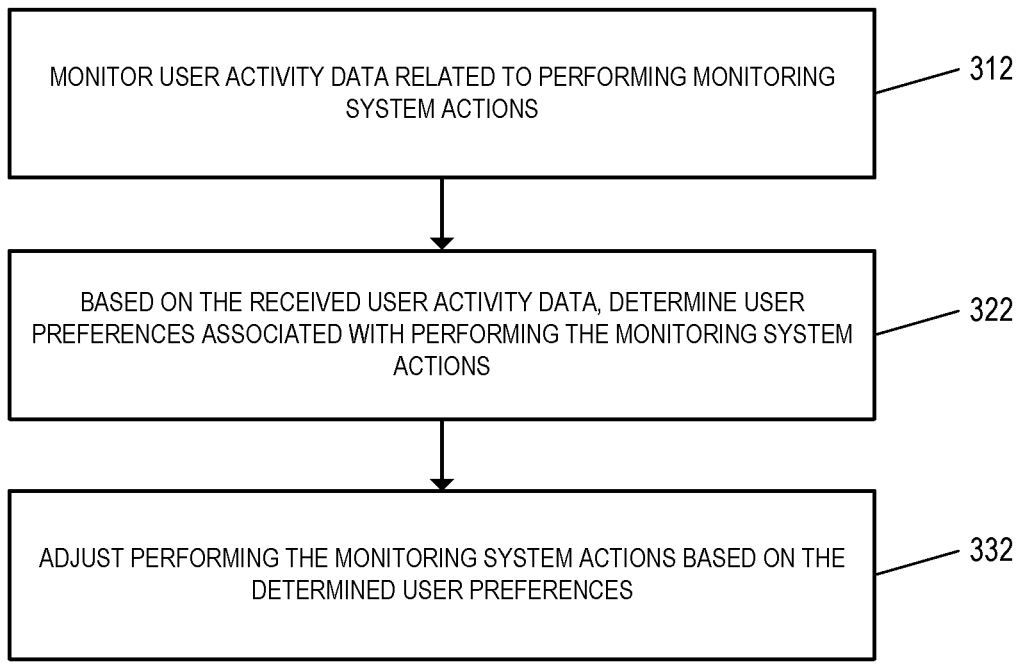

FIGS. 3A-3B illustrate example processes respectively, for extensions of aberration engine technology. Briefly, FIG. 3A illustrates an example process 300A for detecting abnormal installations using an aberration engine, and FIG. 3B illustrates an example process 300B for adjusting operations of an aberration engine based on user preferences.

In more detail, the process 300A may include collecting real-time installation data for installation of a monitoring system within a property (310). For example, the monitoring server 160 may receive, over the network 105, real-time data indicating installations of sensors, control panels, cameras, communication units, and other components of a monitoring system. The installation data may be transmitted from a monitor control unit 110 of the property where the monitoring system is being installed and/or may be transmitted from a device used by an installer of the monitoring system. In this example, the real-time installation data may be indications of addition/removal/modification of components (e.g., sensors, control panels, cameras, home automation controls, etc.) of the monitoring system and/or sensor events detected by various sensors located with the property. The monitoring server 160 may then receive all data related to the installation, including sensor events detected by the monitoring system during installation.

In some implementations, the collection of the real-time installation data may include detection of sensor events after an initial installation but before completion of the installation within the property. For example, the monitoring system may be an alarm system that requires installation of multiple door and window sensors and a central security panel within the property. In this example, the monitor control unit 110 may initially detect the installation of the central security panel within the property and then detect sensor events that are indicated by individual door and window sensors added as sensors to the central security panel. In this regard, the monitor control unit 110 may be used to determine when the installation of the monitoring system initially begins, as well as the progression of the installation indicated by time points associated with each individual door or window sensor being installed into the property.

The process 300A may include aggregating the collected installation data of nearby properties over a period of time (320). For example, the monitoring server 160 identifies the property and/or user associated with the collected installation data and stores sensor events collected over time for the identified property and/or user with an indication of the identified property and/or user. In this regard, the monitoring server 160 stores the collected sensor events in a manner that enables the monitoring applications server 160 to access all of the collected sensor events for the identified property and/or user. The monitoring server 160 may aggregate the collected sensor events over any period of time, including all sensor events collected over years, sensor events collected over a period of one or more months, sensor events collected over a period of one or more weeks, or other suitable time periods that enable the system 200 to detect recurring events in the aggregated sensor data.

In some implementations, the monitoring server 160 may additionally collect information related to an installation plan or a purchased system associated with components of the monitoring system that is being installed within the property. In one example, the installation plan may be a cable television service plan that specifies a particular receiver or a satellite dish to be installed within the property. In this example, the monitoring server 160 may collect real-time installation data such as a hardware identification number and a receiver serial number, and an installation plan that indicates the type of cable service that the property owner has purchased from a cable television service provider. The monitoring application server may then compare the real-time installation data and the installation plan to ensure that the receiver model and satellite dish are being installed in the property.

The process 300A may include detecting, within the aggregated data, an abnormal installation (330). For example, the monitoring server 160 may analyze the aggregated data to detect patterns of recurring installation events in the aggregated data. The monitoring server 160 may detect installation events as events sensed by sensors of the monitoring system. The monitoring server 160 may consider the timing of events, such as events that repeat on a routine basis (e.g., installation events that occur at the relatively same time everyday day or installation events that occur at the relatively same time on a particular day of the week), or the timing of events that are related to particular components of a monitoring system that is being installed within the property.

In detecting patterns, the monitoring server 160 may consider any type of historical sensor activity detected by a monitoring system located at a property. The monitoring server 160 also may consider other types of activity, such as location data of one or more users of the monitoring system, data collected by sensors of a vehicle of one or more users of the monitoring system, weather data accessible to the monitoring system, or any other type of data that the system 200 is capable of collecting, aggregating, and analyzing.

The monitoring server 160 may detect an abnormal installation event based on comparing the collected real-time installation data sensed by a sensor, and the detected patterns within the aggregated collected installation data. For instance, as described in FIG. 1, if the installation data indicates that there are no nearby sensor installations near a property, the monitoring server 160 may detect an abnormal installation event. In other instances, if a particular installation event exceeds an average time frame indicated by the aggregated installation data, the monitoring server 160 may also detect an abnormal installation event.

In some implementations, the monitoring server 160 may additionally or alternatively evaluate the timing of installation events associated with components (e.g., sensors) of a monitoring system that is being installed within the property. In one example, the monitoring system may be a personal security system that includes components such as different security cameras that are to be installed in different locations of the property (e.g., living room, dining room, bed rooms, basement, etc.). In this example, the monitoring server 160 may initially determine the timing associated with the first security camera installed within the property and then track the timing associated with each subsequent camera that is installed in other locations of the property. In this regard, the monitoring server 160 may determine an aberration event if there is a significant delay between the timing of installation events between different cameras, which may indicate that the individual security cameras may have been tampered with prior to their installation within the property.

In other implementations, in addition to aggregating installation data between multiple properties within a particular location, the aberration engine may consider additional information related to the installations in determining whether an aberration event has taken place. For instance, in some instances, the application server 160 may receive the number of other installations performed by a particular service personnel, the number of follow-up requests or service requests made previously for the other installations, or the order of the other installations. In such instances, the information related to the service personnel may be used to determine whether an instant installation is likely to be faulty based on a historical track record of the installations performed by the service personnel. For example, if the information related to a particular service personnel indicates a high number of follow-up service requests or component replacements, then the monitoring server 160 may determine a high likelihood that the instant installation may be defective, and transmit a notification to the user indicating the information related to the other installations. In this way, given past installation performance, the monitoring system 160 may detect an aberration more quickly for the particular service personnel than other service personnel with better past performance. In yet another example, the monitoring server 160 may access an online repository managed by the manufacturer of the monitoring system to be installed within the property to retrieve an electronic manual that provides instructions of the installation process. In this example, the monitoring application server may use the information included within the electronic manual to verify the installation performed by the service personnel.

The process 300A may include transmitting an alert in response to detecting the abnormal installation (340). For example, in response to detecting the abnormal installation, the monitoring server 160 may transmit an alert to either one of the one or more devices 140, 150 or the central alarm station server 170 based on the severity of the detected abnormal installation. For instance, if the system 200 is in an unarmed state, the monitoring server 160 may transmit the alert to only the one or more mobile devices 140, 150. In other instances, if the system 200 is in an alarmed state, the monitoring server 160 may transmit the alert to the central alarm stations server 170 because the detected abnormal installation may indicate a security breach in the property as a potential tampering with the system 200.

Referring now to FIG. 3B, the process 300B may include monitoring user activity data related to performing monitoring system actions (312). For example, the monitor control unit 110 may track user activity data related performing monitoring system actions of the system 200 in response to detecting an aberration related to an installation being performed at the property. The user activity data may include particular actions taken by the user in response to receiving a notification indicating an aberration, settings adjusted by the user after receiving the notification, user behavior indicating a positive response (e.g., a user enabling particular settings related to an aberration notifications), or user behavior indicating a negative response (e.g., a user disabling particular settings). In this regard, the monitor control unit 110 may passively monitor data indicating user responses to an aberration event.

In some implementations, the monitor control unit 110 may monitor user responses to a set of recommended aberration detection rules to the user. Examples of such rules are described below with respect to FIG. 5. As an example, the user device 70 may display a user interface that provides recommended rules based on, for example, the type of property of the user and/or the type of monitoring system installed within the property of the user. The user interface may also request the user to provide input regarding whether the user would like the system 200 to use the recommended rule in detecting aberrations in subsequent installations. For example, a user may accept a recommended rule, customize a recommended rule, or remove a recommended rule. In response, the system may adjust the techniques used to detect an aberration based on the user input. For instance, a rule repository used to detect aberrations can be modified to include recommended rules that the user has accepted.

In some implementations, the monitor control unit 110 may additionally store and access user profiles associated with different types of user activity data related to performing installations associated with the system 200. For instance, the monitor control unit 110 may access user profiles of other users that have also responded similarly to the same aberration event as a particular user. In this regard, the monitor control unit 110 may also track the user activity data of other users who are indicated by their user profiles to have provided similar responses to an aberration event as the user of the property where the monitor control unit 110 is located.

The process 300B may include determining user preferences associated with performing the monitoring system actions based on the received user activity data (322). For example, the monitor control unit 110 may aggregate the received user activity data to determine patterns indicated by the user activity data. For instance, the monitor control unit 110 may aggregate the received user activity data in response to a detected aberration over a particular period of time (e.g., thirty minutes) and passively determine activity patterns that indicate user preferences that are repeated over the particular period of time. For example, if a user repeatedly dismisses an alert notification related to a detected aberration, then the monitor control unit 110 may determine, based on the user activity data indicating the number of times the user has dismissed the alert notification, that the user may prefer to send a notification of the aberration event to either an emergency contact or the central station server 70.

In another example, if a user repeatedly uses a particular monitoring system action after an aberration event, then the monitor control unit 110 may determine, based on the repeated usage of the monitoring system action, the monitor control unit 110 may determine that the usage patterns indicate a user preference for performing the particular monitoring system action in response to an aberration event. In another example, if a user avoids use of a particular monitoring system action (e.g., by manually disabling a monitoring system action, or not using the monitoring system action) after an aberration event, the monitor control unit 110 may determine that the usage patterns indicate a user preference against the usage of the particular monitoring system action in response to an aberration event.

In the context of installations performed at the property, user input may be monitored in relation to different types of installations (e.g., installations of new devices/components or repairs of existing devices/components). In this regard, the monitor control unit 110 may automatically determine, based on the received user input, specific user preferences for different types of installations. For example, extensive user input after notifications provided in relation to security system installations may indicate that the user considers installations related to security system as high priority. In comparison, lack of user input (or active dismissals) after notifications provided in relation to HVAC system installations may indicate that the user considers these installations as low priority. In response, the system 200 can adjust the action taken in response to detecting an aberration relating to a security system installation compared to detecting an aberration relating to a HVAC system operation. For example, the system 200 may use different notification and reporting standards for each type of installation type.

The process 300B may include adjusting the monitoring system actions based on the determined user preferences (332). For example, the monitor control unit 110 may enable or disable particular monitoring system action of the system 200 in response to an aberration based on the determined user preferences. For instance, if the user preferences indicate that the user repeatedly uses a particular monitoring system action after an aberration event, the monitor control unit 110 may transmit instructions to the one or more mobile devices 140, 150 to display alerts, notifications, or informational messages to the user to use other features that are related to the particular monitoring system action in response to an aberration event. In such instances, the monitor control unit 110 transmits a positive signal regarding the particular feature based on the user preferences indicating that the user repeatedly uses that monitoring system action. In other instances, if the user preferences indicate that the user does not use a particular monitoring system action or prefers not to use the particular monitoring system action after an aberration event, the monitor control unit 110 may automatically disable the particular monitoring system action without notifying the user. For example, if the user preferences indicate that the user repeatedly sends notifications to one emergency contact after an aberration event, the monitor control unit 110 may then automatically transmit a notification indicating the aberration event passively without requiring user input.

In the context of installations performed at the property, the determined user preferences can be used to adjust the actions taken in response to detecting an aberration. For example, if prior user input indicates that he/she has repeatedly found certain installations to be insufficient, instead of providing an alert notification in response to detecting an aberration of an installation, the monitor control unit 110 may instead provide modified installation instructions to a device of the technician that performs the installation. In another example, if a user preferences indicate complaints relating to a configuration of a component, then during an installation relating to the configuration of the component, an automatic alert notification indicating the user's complaints may be transmitted to a device of the technician performing the installation. In this regard, the user's preference related to prior installations can be used to intelligently adjust the way in which the system 200 responds to subsequently detected aberrations of similar installations.

Figure 4A:
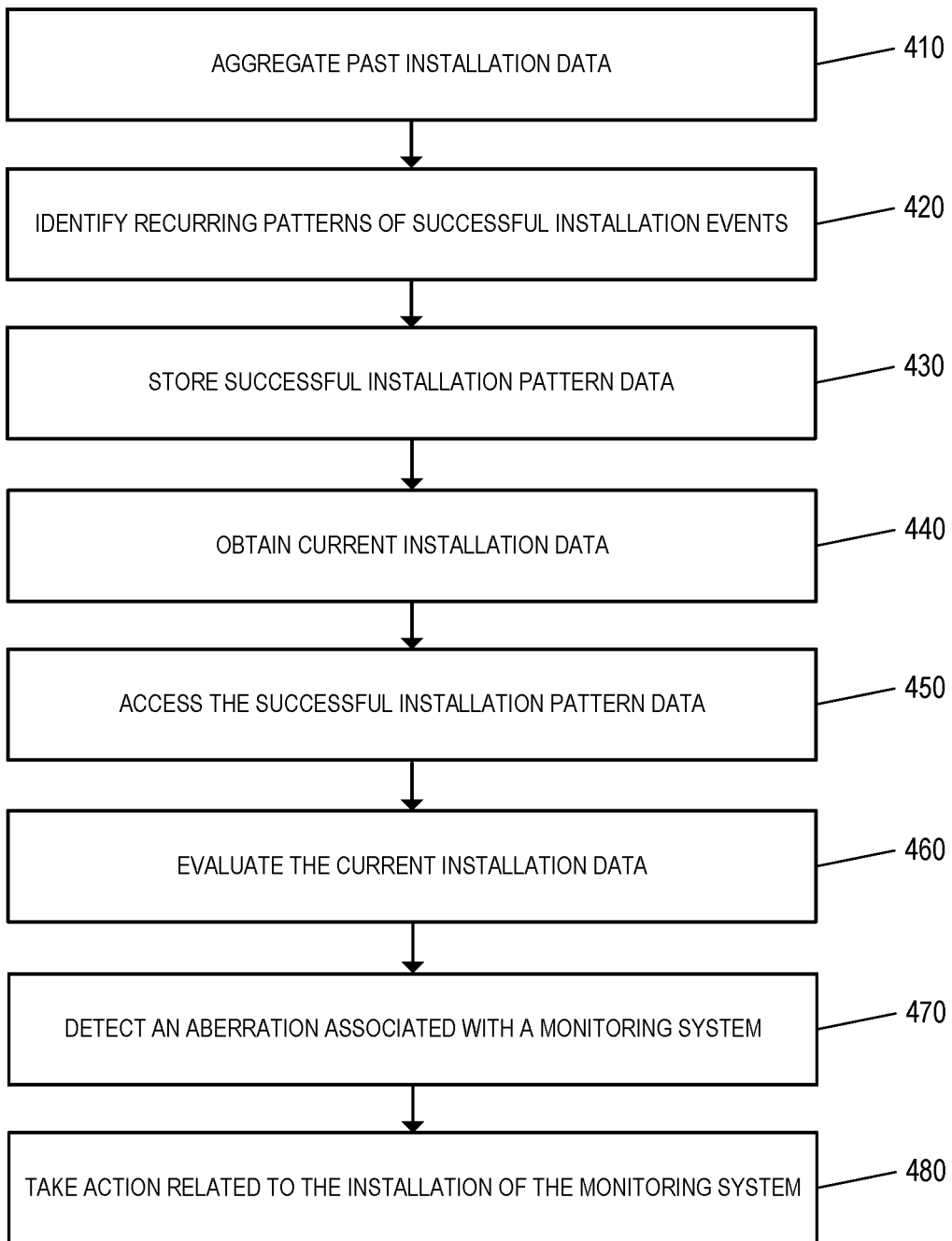
FIG. 4A illustrates an example of a process for automatically detecting an abnormal installation within a property.

FIG. 4A illustrates an example of a process 400A for automatically detecting an abnormal installation within a property. For instance, the process 800 can include aggregating past installation data (410), identifying recurring patterns of successful installation events (420), storing successful installation pattern data (430), obtaining current installation data (440), accessing the successful installation data (450), evaluating the current installation data (460), detecting an aberration associated with a monitoring system (470), and taking action related to the installation of the monitoring system (480).

The process 400A may include aggregating past installation data (410). For instance, the monitoring server 160 aggregates data indicating past installation events for multiple properties over a period of time. The installation events may be any types of events that occur during installation of a monitoring system, such as addition of components, configuration of components, removal of components, modification of components, establishment of settings and/or rules, equipment input and/or data recorded by equipment used by installer, testing data input from technician and/or user, and sensor events/actions taken after component installation, but prior to completion of system installation. The data may also include timing of the past installation events that occurred during past installations of monitoring systems at the multiple properties. For example, the multiple properties can be properties that are located within a specified region such as a local municipality. As described below with respect to FIG. 4B, in some implementations, the data can be aggregated based on the region, the service provider associated with the monitoring systems, the property type, and/or the device type of the device to be installed.

The process 400A may include identifying recurring patterns of successful installation events (420). For instance, the monitoring server 160 may analyze the aggregated data to identify recurring patterns of successful installation events. In some instances, recurring patterns may be identified for an individual property. For example, the aggregated data may include a number of installations that took place within a property, or a number of times that a maintenance operation was performed on an existing installation of a device or monitoring system. In other instances, recurring patterns may be may identified for one or regions that include multiple properties.

For instance, the aggregated data may include timings associated with when a device is installed in multiple properties within a certain region, or a frequency at which installations of the device are performed within the region. The recurring patterns may also include the total time that it took to install a device or monitoring system. As an example, multiple properties within the certain region may have similar HVAC systems that utilize the same components (e.g., thermostats, furnace filters, etc.). In this example, prior installations of thermostats at each of the multiple properties may be analyzed to identify recurring patterns. For instance, the aggregated data may indicate that thermostats are likely to be installed in the morning based on a high percentage of prior thermostat installations performed within the region being in the morning. In another example, the aggregated data may indicate that thermostat installations are likely to take about an hour to complete based on a high percentage of prior thermostat installations performed with the region taking an hour. In yet another example, if the aggregated data indicates that a large portion of properties within the region have had thermostats either replaced or repaired on a bi-annual basis, then subsequent repairs or installations for a property within the region may be estimated to be performed on a bi-annual basis.

The process 400A may include storing successful installation pattern data (430). For instance, the monitoring server 160 may store data descriptive of identified recurring patterns of successful installation events in electronic storage (e.g., a database associated with the monitoring server 160). In some instances, successful installation events refer to prior installations at a property in which a monitoring system identified as a non-aberrant installation. For example, a successful installation can be an installation that was completed within an expected period of time given the type of installation to be performed. Successful installation events can be identified within the aggregated data based on identifying signaling events recorded by a monitoring system. For example, the monitoring application 160 may identify signals descriptive of communications between a control unit and a recently installed device as an indicator that the installation was performed successfully.

The process 400A may include obtaining current installation data (440). For instance, after storing the aggregated installation data, the monitoring application server may obtain data descriptive of one or more current installation events. The current installation events occur during an installation of a device or component and/or an installation of a monitoring system within a particular property. In some instances, the data can be associated with a new installation of a monitoring system (e.g., a new security system to be installed within a property). Additionally, or alternatively, the data can also be associated with an installation of a new device into an existing monitoring system (e.g., a new door sensor to be installed to operate with an existing security system of a property). In other instances, the current installation data may include installations related to monitoring operations for an existing monitoring system (e.g., repair operations for a defective device).

The current installation data can be obtained from different devices. In some instances, the current installation data can be obtained from a newly installed component of a monitoring system at a property where the installation is taking place. For example, if a new door sensor is being added to a security system of a property, then once the new door sensor is configured to exchange communications with a security panel, the configuration data of the door sensor is descriptive of a current installation event related to the door sensor. In other instances, the current installation data can be obtained from a device used by a technician to perform the installation. For example, the addition of a door sensor may be registered by equipment the technician uses to update the control panel. In this example, the registration of the door sensor may be verified against data received at the control panel for the door sensor. In another example, during an installation operation of a network router, an installation technician may use an external electronic device to determine internet connectivity prior to installing the network router. In this example, network connectivity data can be obtained from the external electronic device in order to identify a current connection event associated with the router to be installed.

The process 400A may include accessing the successful installation data (450). For instance, after obtaining the current installation data, the monitoring server 160 may access the stored data descriptive of successful installation events. In some instances, the data is accessed from a database associated with the monitoring server 160.

The process 400A may include evaluating the current installation data (460). For instance, the monitoring server 160 may evaluate data descriptive of current installation events to the accessed data descriptive of prior successful installations. The monitoring server 160 may evaluate attributes associated with the current installations to recurring patterns associated with the successful installations. For example, the monitoring server 160 may compare the average time to complete a successful installation for a device to an elapsed time for the current installation events. In another example, the monitoring server 160 may compare the general time associated with successful installations to the time associated with the current installation events.

As described below with respect to FIG. 5, in some implementations, the monitoring server 160 may use a set of rules that specify respective scores associated with evaluations of each attribute. For example, each rule may specify threshold values for evaluated attributes in order for the system to determine that an aberration has occurred during the installation. The threshold values can be specified for each component to be installed, the type of installation being performed, the type of property where the current installation is taking place, among other facts. In this example, each rule can also be associated with a score that reflects a likelihood that the satisfaction of the rule is an actual aberration. In this regard, scores associated with each rule can be used to adjust the sensitivity by which the monitoring server 160 determines that an aberration has occurred for a current installation event.

The process 400A may include detecting an aberration associated with a monitoring system (470). For instance, the monitoring server 160 may determine that an aberration has occurred during the installation of a device or a monitoring system within a property. This determination may be based on the evaluation of the current installation data against the successful installation pattern data. In some instances, this determination can be performed in real-time to enable aberration detection prior to completion of the installation. For example, as described below, when an aberration detection rule is satisfied for a current installation, the satisfaction can trigger an aberration detection that generates a real-time alarm condition for the monitoring system of the property as the installation occurs.

As described throughout, the monitoring server 160 can detect an aberration for a current installation in various circumstances. In some instances, the monitoring server 160 may detect an aberration if an installation of a component or a monitoring system is taking longer than a baseline timing of past installations of monitoring systems at other properties. For instance, the aggregated installation data may specify a baseline installation time for completion based on prior successful installations at multiple properties that have similar components or monitoring systems. As an example, prior successful installation of thermostats in multiple properties within a certain region may indicate that installations, on average, take about two hours to complete. The baseline installation time for completion can then be set to two hours from when a current installation is detected to initiate (e.g., based on a thermostat configuration signal received on the monitor control unit). During the installation, the monitor server 160 may monitor the duration of the installation and once the installation takes longer than the baseline installation time, the monitoring server 160 may determine that an aberration has taken place.

In other instances, the monitoring server 160 may detect an aberration if the installed monitoring system fails to match a combination of types of components installed in a certain percentage of past installations. For instance, the aggregated installation data may indicate that a certain combination of components were used in prior successful installations across multiple properties (e.g., certain manufacturers associated with the components installed, or certain configurations of components that were successfully installed). An aberration can be detected if the current installation data indicates that a certain component is missing, or if a certain component may be of lower quality compared to the components used in prior successful installations indicated by the aggregated installation data. Referring back to the example relating to thermostat installations, the aggregated installation data can include device information for the types of thermostats that were installed within multiple properties (e.g., make/model, device manufacturer, warranty information, etc.). In addition, the aggregated installation data can also include a list of ancillary components that are also typically installed during a thermostat installation (e.g., heating or cooling components of a HVAC system). In this regard, if a lower quality thermostat is detected by the monitoring server 160 during the installation process, or if certain components are not detected during the installation process, the monitoring server 160 may determine that an aberration has taken place.

In other examples, the monitoring server 160 may detect an aberration if an order in which components are added during a current installation does not match an order that components are installed in a certain percentage of past installations. For instance, the aggregated installation data may indicate recurring component installation patterns associated with prior successful installations across multiple properties. Sensor data collected by multiple sensors within the property in relation to an installation be compared in order to identify installation events. For instance, collected sensor data prior to the start of the installation such as detected movement through the property, opening of doors/windows, and/or other actions can be used to determine how an installation is performed. Referring back to the example related to a thermostat installation, timestamps associated with collected motion sensor data within a hallway of the property, occupancy data within a room where the thermostat is to be installed, and configuration data between an installed thermostat and the monitor control unit 110 can be used to determine an order of installation events. The determined order can then be compared against an order associated with prior successful installations within the aggregated installation data. In this regard, the monitoring server 160 can use order of events to determine if an installation was properly performed. For example, if a technician skips an energy optimization step while configuring the thermostat, then this omission can be detected and used to determine that an aberration has occurred. In this example, although the omission does not render the thermostat inoperable, it may also lead to unnecessary energy costs because the thermostat was improperly configured when installed in the property.

The process 400A may include taking action related to the installation of the monitoring system (480). For instance, the monitoring server 160 may take action related to the installation of the device at a property based on the detection of the aberration associated with the installation of the device at the property. The action taken can include providing a notification of the aberration to an authorized entity (e.g., a security provider of the property, a property owner or an authorized resident, and/or a central station server 70), and/or providing a notification of the aberration to the technician performing the installation. Referring back to the example regarding thermostat installation, in response to detecting one or more aberrations, the monitoring server 160 may provide notifications that provide a list of detected aberrations described above (e.g., improper thermostat device installed, improper energy configuration for the installed thermostat). The notifications can also include a list of events related to the thermostat installations (e.g., collected motion sensor data from areas where the installation took place, initial thermostat configuration, and control signals exchanged between the thermostat and the monitor control unit 110). Each event may be associated with a corresponding time point to provide contextual information related to the detected aberrations.

In some implementations, the monitoring server 160 may selectively transmit notifications of detected aberrations to a particular entity based on the present circumstances of the user and property. For example, if a user goes on vacation is presently unavailable when an aberration is detected, then the notification mat instead be transmitted to the central alarm server 70. In another instances, notifications may be transmitted to different entities based on the type of aberration identified. For example, a detected aberration related to a technical issue may result in a notification being transmitted to the technician that performed the installation whereas another detected aberration related to a user preference may result in a notification being transmitted to the user. In some instances, the monitoring server 160 may also redundantly transmit multiple notifications to different users.

In other examples, the action taken can also include transmitting installation instructions to assist the technician while performing the installation. For instance, the monitoring server 160 may determine whether an installation is likely being performed incorrectly based on comparing various types of detected information relating to installation events as described above (e.g., detecting the presence of newly installed components, the combinations of components installed, or order of connection events in relation to the installation being performed). Referring back to the thermostat installation example, the monitoring server 160 may initially determine that a newly thermostat is incorrectly configured with an existing HVAC system. In response, the monitoring server 160 may transmit a notification indicating the incorrect configuration to a device of the technician. The notification can include the correct configuration as indicated by prior installation data from other properties where the same combination of the thermostat and the HVAC system were installed in other properties.

In other instances, the monitoring server 160 may provide transmission signals to components of the monitoring system (e.g., the control panel 20) to automatically initiate a guided installation process. Referring back to the thermostat installation example, once the monitoring server 160 identifies an incorrect configuration of the newly installed thermostat, the monitoring server 160 may transmit an instruction to the monitor control unit 110 to display an alert notification indicating the incorrect configuration and also providing a step-by-step installation procedure to assist the technician to correct the installation of the thermostat. The installation instructions can be obtained based on an analysis of prior installations performed at other properties. For example, installation data may be correlated against maintenance data in order to identify optimal installation conditions indicated by the installation configurations that resulted in the lowest number of maintenance operations being performed across multiple properties. In this regard, the action taken by the monitoring server 160 (e.g., transmitting instructions to correct a possible incorrect configuration of a component) can be used to improve the likelihood of a successful operation by assisting the installation technician and potentially reducing the need to perform additional maintenance operations after the component has been installed.

In some implementations, the particular action taken by the monitoring server 160 may be based on a set of user preferences associated with the monitoring system and/or user feedback regarding previously detected aberrations.

Additionally, or alternatively, in some implementations, the action taken by the monitoring server 160 may include transmitting instructions to components of the monitoring system to perform certain actions associated with the property (e.g., enabling a security camera to capture video footage, triggering an audible alarm at the property).

Figure 4B:
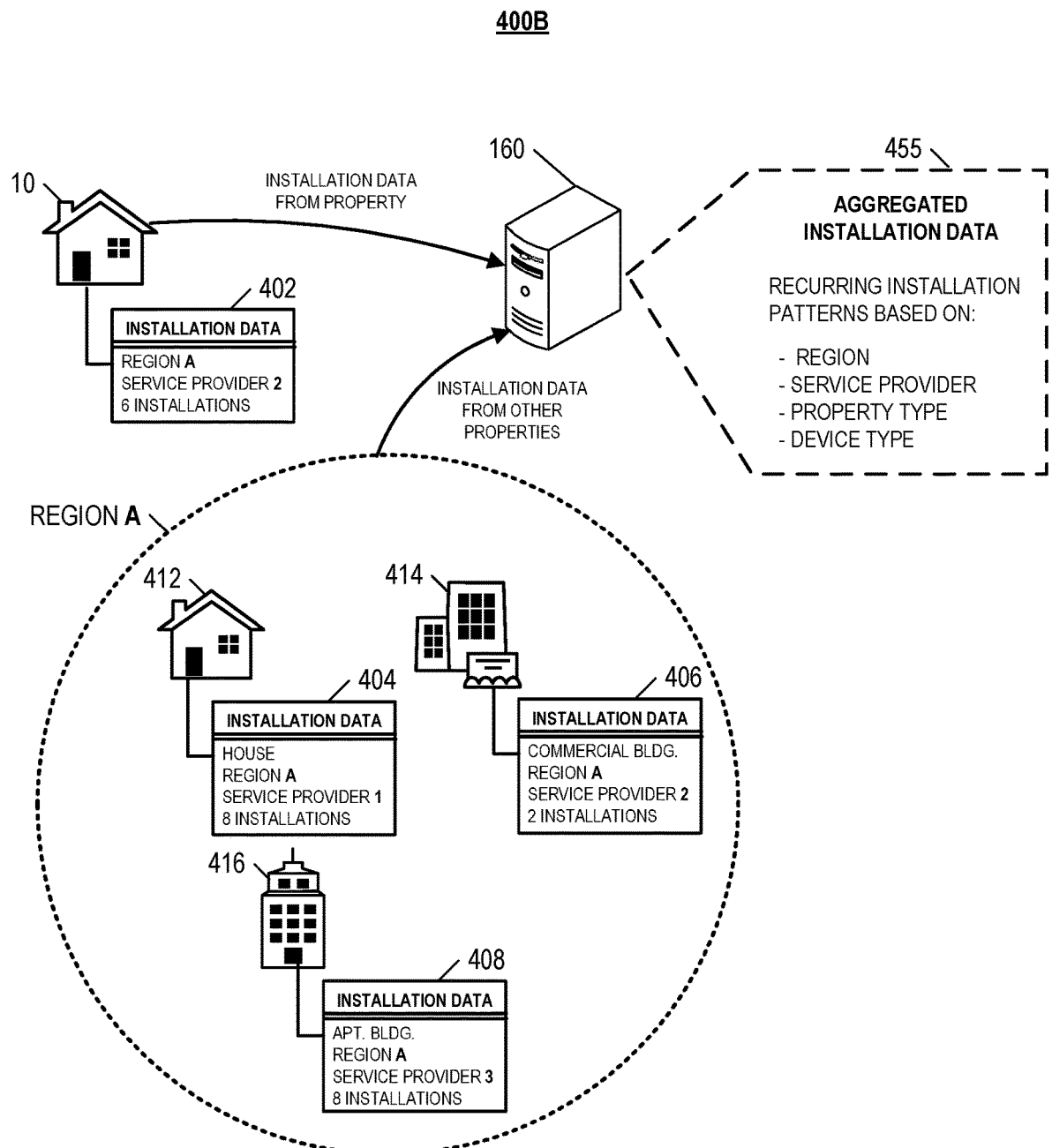
FIG. 4B illustrates an example of a process of system that aggregates installation data obtained from multiple properties.

FIG. 4B illustrates an example of a system 400B that aggregates installation data obtained from multiple properties. For instance, the monitoring server 160 may obtain installation data 402 associated with the property 10. The monitoring server 160 may also obtain installation data from other properties that are determined to be similar to the property 10. As shown, the monitoring server 160 obtains installation data 404, 406, and 408 associated nearby properties 412, 414, and 416, respectively. The properties 412, 414, and 416 may be identified by the monitoring server 160 based on being located in the same region as the property 10 (e.g., Region A). In this example, a region can represent any municipality classification, such as a postal code, a neighborhood, among others.

The properties 412, 414, and 416 may represent different types of properties. For example, as depicted, the property 412 may be a single family home, the property 414 may be a commercial building, and the property 416 may be a residential apartment building with multiple tenants. In addition, while FIG. 4 illustrates obtaining installation data from one region (e.g., region A), in some implementations, the monitoring server 160 can also obtain data from multiple regions.

Each of the installation data 402, 404, 406, and 408 may specify various types of information associated with prior installations performed at the corresponding property. For example, as discussed above with respect to FIG. 4A, the obtained installation data may specify a region in which the property is located, the number of installations performed at the property within a certain period of time, and service providers that performed each of the installations. In some instances, the installation data can include additional information such as identifying installations that are recurring (e.g., maintenance operations), and installations that are only performed once (e.g., a new system installation). In addition, the installation data can also include statistics associated with each installation operation (e.g., time that an installation operation was performed, the total amount of time to complete the installation operation, or serial numbers of devices/components used to perform the installation operation).

After obtaining the installation data 402, 404, 406, and 408, the monitoring server 160 may aggregate the obtained installation data as described above with respect to FIG. 4A. The monitoring server 160 may generate the aggregated installation data 455 based on aggregating the obtained installation data with respect to different recurring installation patterns. In some instances, recurring installation patterns may be aggregated based on the region associated with the multiple properties 412, 414, and 416 to identify installation patterns of nearby properties. For example, the aggregated installation data for a region can be used to identify location-specific patterns that may be useful in evaluating subsequent installations at another property within the region.

In other instances, the recurring installation patterns may be aggregated based on different types of service providers associated with the multiple properties 412, 414, and 416. For example, installation data aggregated for a particular security provider across multiple properties may be used to identify the particular action for the monitoring server 160 to take in response to detecting an aberration with a subsequent installation performed at a property that is associated with the particular security provider. In other examples, the recurring patterns may be aggregated based on the service providers associated with the technicians that performed the installations at the multiple properties 412, 414, and 416. In such examples, the recurring patterns associated specific service providers and/or installation technicians can be used to determine a likelihood that an aberration may take place during a subsequent installation performed by the same installation technicians.

In other instances, the recurring installation patterns may be aggregated based on the property type of the multiple properties 412, 414, and 416 and/or the type of device/component to be installed within the multiple properties 412, 414, and 416. In such instances, categorizations associated with a specific property or a specific installation can be used to filter the aggregated installation data 450 with respect to recurring installation patterns that are relevant to the specific property or the specific installation.

Figure 5:
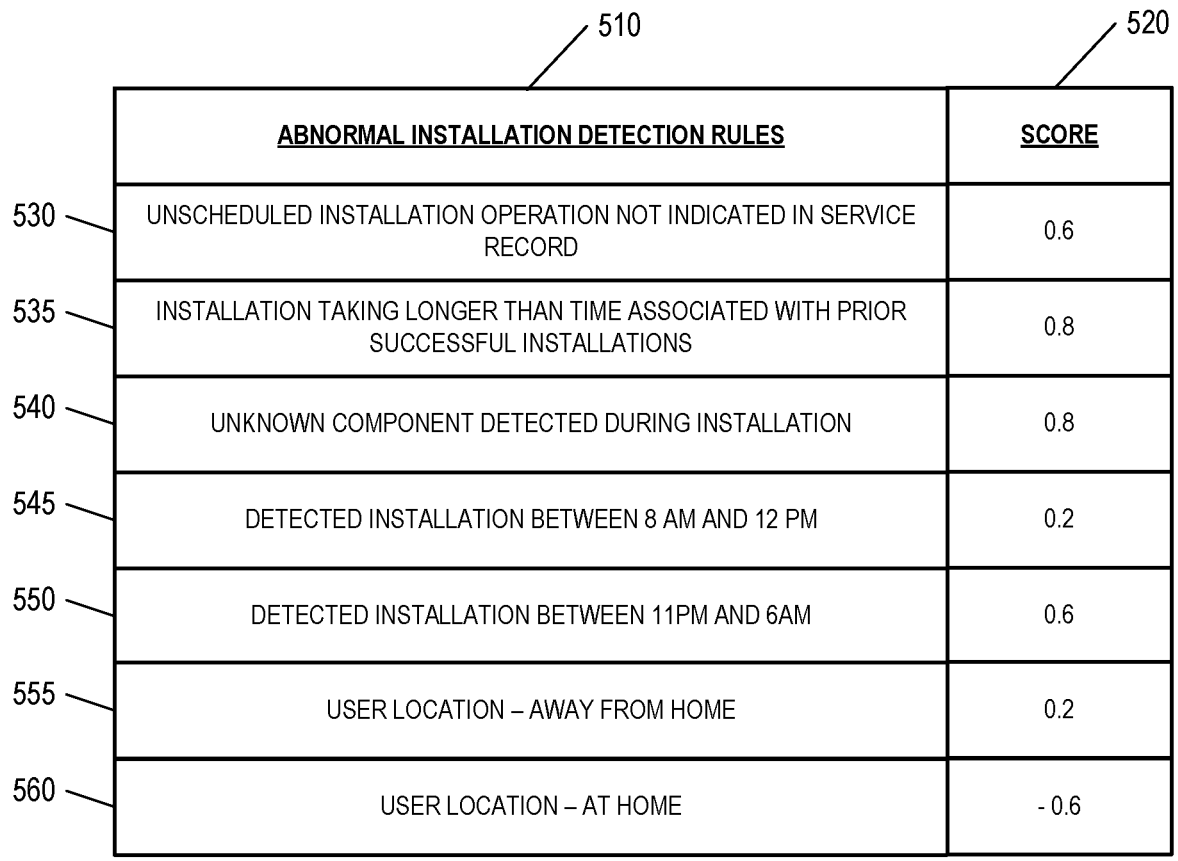
FIG. 5 illustrates an example of a repository that stores rules for detecting abnormal installations.

FIG. 5 illustrates an example of a repository 500 that stores rules for detecting abnormal installation operations. The repository 500 includes a first column 510 indicating a rule used to assess whether collected sensor data indicates abnormal activity, and a second column 520 indicating an abnormality score associated with the rule specified in the column 510. In general, the rules specified within the column 510 and their corresponding abnormality scores specified within the column 520 enable the monitoring server 160 to determine that an aberration has occurred as an installation is being performed at a property (e.g., the property 10).

Each individual rule within column 510 specifies conditions related to different attributes of an installation operation. For example, rules 530 and 535 relate to timing associated with an installation, such as whether the installation was scheduled within a service record or if the time to complete installation corresponds to a predetermined time associated with prior successful operations. Rule 540 relates to the particular device and/or component that is to be installed or is being installed at the property. Rules 545 and 550 relate to the time when an installation is detected. Rules 555 and 560 relate to a user's location within the property while the installation is taking place.

As described above, the monitoring server 160 may determine that an aberration may have occurred based on the satisfaction of conditions specified by individual rules. For example, if the monitoring server 160 determines that a current detected installation is not indicated within a service record for the property, then the conditions specified by the rule 530 have been specified, and, in response, the monitoring server 160 may determine that an aberration relating to the current installation may have occurred. In some instances, the conditions for multiple rules may be determined to be satisfied. In such instances, the monitoring server 160 may use the associated abnormality scores of each of the rules that have been satisfied to analyze an overall likelihood that an aberration has taken place.

In addition to using conditions specified by the rules included in the repository 500 to determine whether an aberration has taken place, the monitoring server 160 also uses the associated abnormality scores to distinguish between false positive aberration determinations and true aberration determinations. As depicted in FIG. 5, some rules can be associated with positive abnormality scores used to indicate that the satisfaction of their conditions are indicative of an aberration taking place. Alternatively, other rules can be associated with negative abnormality scores used to indicate that the satisfaction of their conditions are indicative of an aberration not taking place. In this regard, the repository 500 may include "positive rules" that can be used to up-weight an overall probability associated with an aberration determine and "negative rules" that can be used to down-weight the overall probability.

In addition, the value of each abnormality score may be used to reflect a respective likelihood that an individual rule satisfaction is associated with the determination that an aberration has occurred. For example, the higher abnormality score for rule 535 compared to rule 545 indicates that the satisfaction of rule 535 represents a higher likelihood of an aberration compared to the satisfaction of rule 545. In this example, the difference in the abnormality score values can be based on, for example, installation data associated with prior installations included within the aggregated data described above with respect to FIGS. 4A-4B.

In some instances where multiple rules are satisfied during an installation (e.g., an unscheduled installation that is taking longer than expected), the monitoring server 160 may combine the associated abnormality scores in order to determine the overall probability that an aberration has occurred. In some examples, the monitoring server 160 may average each of the abnormality scores for each of the satisfied rules. In other examples, the monitoring server 160 may use combination techniques in order to determine the overall probability.

In some implementations, the assigned abnormality scores for each individual rule may be periodically adjusted based on installation data obtained by the monitoring server 160. For instance, an abnormality score for a particular rule may be increased over time if subsequently obtained installation data indicates that the conditions associated with the particular rule are taking place more frequently in multiple properties and/or are being less likely to be associated with a successful installation. As an example, if installation data for a particular region within a six month period indicates a low number of aberrations associated with the amount of time it takes to complete an installation, the abnormality score associated with the rule 535 may initially be set to a low value (e.g., 0.2). However, if installation data for the same region within a subsequent six month period indicates a higher number of aberrations, then the value for the abnormality score for the rule 535 may be adjusted to reflect this change within the newly obtained installation data. In this regard, abnormality scores for individual rules can be updated to reflect seasonal changes and/or other factors that impact installations being performed in a particular region.

Figure 6:
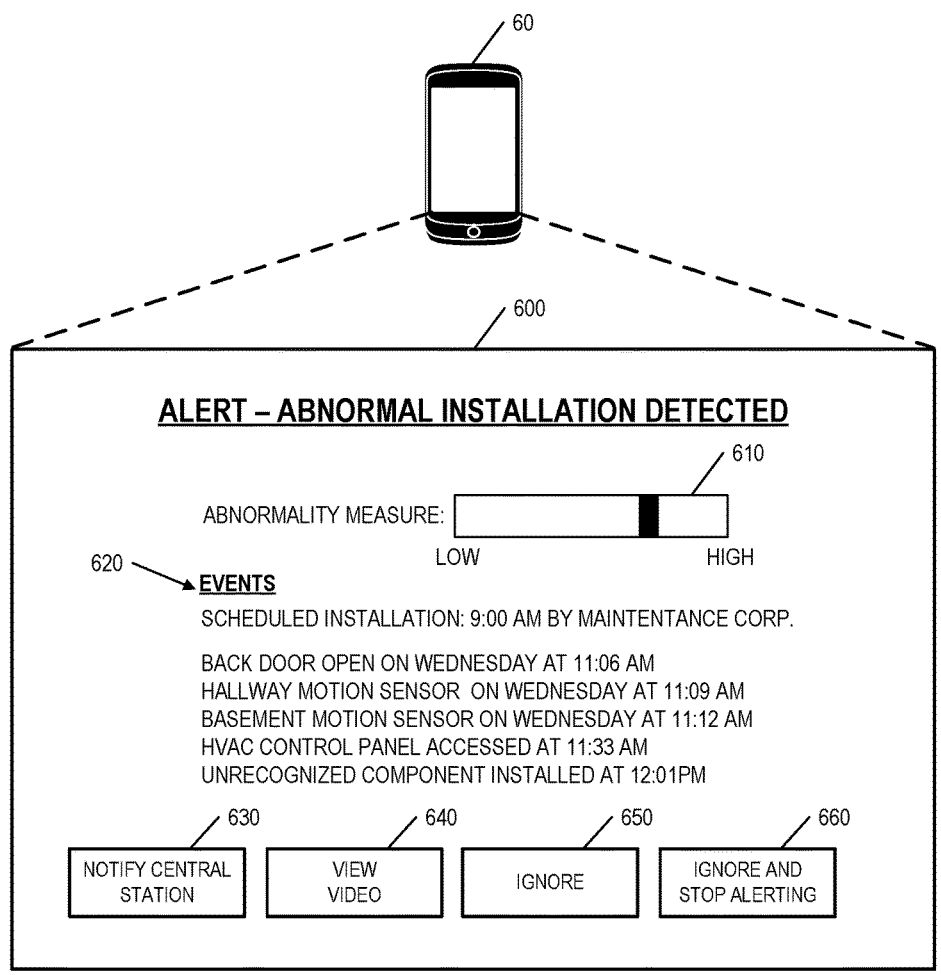
FIG. 6 illustrates an example of a user interface that alerts a user to a detected abnormal installation.

FIG. 6 illustrates an example interface 600 that alerts a user to abnormal activity. The interface 600 may be part of a message (e.g., electronic mail message) sent to a device of a user of a monitoring system when abnormal activity has been detected. The monitoring server 160 may cause display of the interface 600 as part of taking action related to the monitoring system based on the detected patterns of recurring events described above with respect to FIG. 4A.

The monitoring server 160 may detect abnormal activity based on a series of installation events that are each slightly abnormal, but, when considered together, suggest abnormal activity. For instance, the monitoring server 160 may identify a series of events detected by the monitoring system and determine abnormality measures based on the detected patterns of recurring events within the aggregated data. The determined abnormality measures may include an abnormality measure for each event included in the series of events. The monitoring server 160 then may determine an abnormality score for the series of events based on the determined abnormality measures, compare the abnormality score to a threshold, and, based on the comparison, determine that the abnormality score meets the threshold (e.g., the abnormality score is greater than an abnormality threshold). Based on the determination that the abnormality score meets the threshold, the monitoring server 160 may send, to the user, an alert including the interface 600, which indicates that the monitoring system has detected abnormal activity related to a current installation being performed at the property of the user.

The interface 600 includes an abnormality measure 610 that reflects a level of abnormality represented by the series of events. The abnormality measure 610 may be determined based on the abnormality score and, as shown, may be represented as a bar that reflects whether the abnormal activity is highly abnormal, moderately abnormal, or slightly abnormal. The abnormality measure 610 provides a quick indication of whether the level of abnormality of the detected activity is relatively low or relatively high and, therefore, may assist the user in determining how closely the user reviews the alert including the interface 600.

The interface 600 also includes a list of events 620 that resulted in the monitoring server 160 detecting abnormal activity at the property of the user. The list of events 620 enables a user to review the sensor events that led to the determination of abnormal activity and determine whether the events are normal or related to an alarm condition. For example, as depicted, the list of events 620 shows that an installation was started two hours after a scheduled installation, and that an unrecognized component was installed, which then caused the monitoring server 160 to determine that abnormal activity has taken place during the installation.

The interface 600 further includes interface controls 630-660 that enable a user to respond and handle the report of abnormal activity. The interface controls 630-660 include a notify central station control 630 that receives user input to indicate that the user believes the abnormal activity is an alarm condition that should be reported to the central station. In response to user activation of the notify central station control 630, the monitoring server 160 receives the indication that the user believes the abnormal activity is an alarm condition and then reports the alarm condition to the central station with an indication that the user has confirmed that the activity is an alarm condition.

The interface controls 630-660 also include a view video control 640 that receives user input to indicate that the user would like to view video of the property to assist in determining whether the activity is normal or an alarm condition. In response to user activation of the view video control 640, the system 200 receives the indication that the user would like to view video of the property and then sends video captured by a camera located at the property to the user's device for viewing. After viewing the video, the user may provide additional input to indicate whether the activity is normal or an alarm condition.

The interface controls 630-660 further include an ignore control 650 and an ignore and stop alerting control 660. The ignore control 650 receives user input to indicate that the user would like to ignore the abnormal activity alert, as the user believes the events relate to an appropriate installation at the property. The ignore and stop alerting control 660 receives user input to indicate that the user would like to ignore the abnormal activity alert and also that the user would like to stop receiving alerts related to abnormal activity.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed application-specific integrated circuits (ASICs).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method performed by one or more computers, the method comprising:
   obtaining, by the one or more computers, aggregate installation data for multiple properties, the aggregate installation data indicating successful installation events at the multiple properties;
   obtaining, by the one or more computers, current installation data indicating an installation of a monitoring system in a particular property from among the multiple properties;
   prior to completion of installation of the monitoring system at the particular property, detecting, by the one or more computers, an aberration associated with the installation of the monitoring system at the particular property based on the current installation data and the successful installation events indicated within the aggregate installation data; and
   performing, by the one or more computers, an action related to the installation of the monitoring system at the particular property based on the detection of the aberration associated with the installation of the monitoring system at the particular property.

2. The method of claim 1, wherein:
   the aggregate installation data identifies an average timing of the past installations of monitoring systems at the multiple properties; and
   detecting the aberration associated with the installation of the monitoring system at the particular property comprises:
      detecting a particular timing of the installation of the monitoring system at the particular property, and
      detecting that the particular timing is longer than the average timing of the past installations of monitoring systems at the multiple properties.

3. The method of claim 1, wherein:
   the aggregate installation data identifies a combination of types of components installed in past installations of monitoring systems at the multiple properties
   detecting the aberration associated with the installation of the monitoring system at the particular property comprises:
      detecting a particular combination of types of components being installed in the installation of the monitoring system at the particular property; and determining that the particular combination of types of components fail to match the combination of types of components installed in a threshold percentage of the past installations.

4. The method of claim 3, wherein detecting the aberration associated with the installation of the monitoring system at the particular property comprises detecting that the installation of the monitoring system at the particular property lacks at least one component installed in the threshold percentage of the past installations.

5. The method of claim 1, wherein:
the aggregate installation data identifies an order in which components that have been installed in past installations of monitoring systems at the multiple properties; and
detecting the aberration associated with the installation of the monitoring system at the particular property comprises:
  detecting a particular order in which components that have been installed in the installation of the monitoring system at the particular property, and
  determining that the particular order fails to match the order in which components that have been installed in past installations of monitoring systems at the multiple properties.

6. The method of claim 1, wherein performing the action related to the installation of the monitoring system at the particular property comprises transmitting, to a security provider, a communication identifying the aberration associated with the installation of the monitoring system at the particular property.

7. The method of claim 1, wherein performing the action related to the installation of the monitoring system at the particular property comprises transmitting, to a user associated with the particular property, a communication identifying the aberration associated with the installation of the monitoring system at the particular property.

8. A non-transitory computer-readable storage device encoded with computer program instructions that, when executed by one or more computers, cause the one or more computers to perform operations comprising:
  obtaining, by the one or more computers, aggregate installation data for multiple properties, the aggregate installation data indicating successful installation events at the multiple properties;
  obtaining, by the one or more computers, current installation data indicating an installation of a monitoring system in a particular property from among the multiple properties;
  prior to completion of installation of the monitoring system at the particular property, detecting, by the one or more computers, an aberration associated with the installation of the monitoring system at the particular property based on the current installation data and the successful installation events indicated within the aggregate installation data; and
  performing, by the one or more computers, an action related to the installation of the monitoring system at the particular property based on the detection of the aberration associated with the installation of the monitoring system at the particular property.

9. The device of claim 8, wherein:
the aggregate installation data identifies an average timing of the past installations of monitoring systems at the multiple properties; and detecting the aberration associated with the installation of the monitoring system at the particular property comprises:
  detecting a particular timing of the installation of the monitoring system at the particular property, and
  detecting that the particular timing is longer than the average timing of the past installations of monitoring systems at the multiple properties.

10. The device of claim 8, wherein:
the aggregate installation data identifies a combination of types of components installed in past installations of monitoring systems at the multiple properties
detecting the aberration associated with the installation of the monitoring system at the particular property comprises:
  detecting a particular combination of types of components being installed in the installation of the monitoring system at the particular property; and
  determining that the particular combination of types of components fail to match the combination of types of components installed in a threshold percentage of the past installations.

11. The device of claim 10, wherein detecting the aberration associated with the installation of the monitoring system at the particular property comprises detecting that the installation of the monitoring system at the particular property lacks at least one component installed in the threshold percentage of the past installations.

12. The device of claim 8, wherein:
the aggregate installation data identifies an order in which components that have been installed in past installations of monitoring systems at the multiple properties; and
detecting the aberration associated with the installation of the monitoring system at the particular property comprises:
  detecting a particular order in which components that have been installed in the installation of the monitoring system at the particular property, and
  determining that the particular order fails to match the order in which components that have been installed in past installations of monitoring systems at the multiple properties.

13. The device of claim 8, wherein performing the action related to the installation of the monitoring system at the particular property comprises transmitting, to a security provider, a communication identifying the aberration associated with the installation of the monitoring system at the particular property.

14. The device of claim 8, wherein performing the action related to the installation of the monitoring system at the particular property comprises transmitting, to a user associated with the particular property, a communication identifying the aberration associated with the installation of the monitoring system at the particular property.

15. A system comprising:
one or more computers; and
one or more storage devices storing instructions that, when executed by the one or more computers, cause the one or more computers to perform operations comprising:
  obtaining, by the one or more computers, aggregate installation data for multiple properties, the aggregate installation data indicating successful installation events at the multiple properties;

obtaining, by the one or more computers, current installation data indicating an installation of a monitoring system in a particular property from among the multiple properties;

prior to completion of installation of the monitoring system at the particular property, detecting, by the one or more computers, an aberration associated with the installation of the monitoring system at the particular property based on the current installation data and the successful installation events indicated within the aggregate installation data; and performing, by the one or more computers, an action related to the installation of the monitoring system at the particular property based on the detection of the aberration associated with the installation of the monitoring system at the particular property.

16. The system of claim 15, wherein:

the aggregate installation data identifies an average timing of the past installations of monitoring systems at the multiple properties; and detecting the aberration associated with the installation of the monitoring system at the particular property comprises:

detecting a particular timing of the installation of the monitoring system at the particular property, and detecting that the particular timing is longer than the average timing of the past installations of monitoring systems at the multiple properties.

17. The system of claim 15, wherein:

the aggregate installation data identifies a combination of types of components installed in past installations of monitoring systems at the multiple properties detecting the aberration associated with the installation of the monitoring system at the particular property comprises:

detecting a particular combination of types of components being installed in the installation of the monitoring system at the particular property; and determining that the particular combination of types of components fail to match the combination of types of components installed in a threshold percentage of the past installations.

18. The system of claim 17, wherein detecting the aberration associated with the installation of the monitoring system at the particular property comprises detecting that the installation of the monitoring system at the particular property lacks at least one component installed in the threshold percentage of the past installations.

19. The system of claim 15, wherein:

the aggregate installation data identifies an order in which components that have been installed in past installations of monitoring systems at the multiple properties; and detecting the aberration associated with the installation of the monitoring system at the particular property comprises:

detecting a particular order in which components that have been installed in the installation of the monitoring system at the particular property, and determining that the particular order fails to match the order in which components that have been installed in past installations of monitoring systems at the multiple properties.

20. The system of claim 15, wherein performing the action related to the installation of the monitoring system at the particular property comprises transmitting, to a security provider, a communication identifying the aberration associated with the installation of the monitoring system at the particular property.

* * * * *

UNITED STATES PATENT AND TRADEMARK OFFICE
CERTIFICATE OF CORRECTION

| | | |
|---|---|---|
| PATENT NO. | : 10,535,253 B1 | Page 1 of 1 |
| APPLICATION NO. | : 16/152884 | |
| DATED | : January 14, 2020 | |
| INVENTOR(S) | : Stephen Scott Trundle | |

It is certified that error appears in the above-identified patent and that said Letters Patent is hereby corrected as shown below:

On the Title Page

Item (54), and in the Specification, Column 1, Line 1, Title, delete "Abberation" and insert -- Aberration --, therefor.

Signed and Sealed this
Sixteenth Day of June, 2020

Andrei Iancu
*Director of the United States Patent and Trademark Office*